INVENTOR.
Millard E. Fry
His Attorney

Feb. 24, 1959   M. E. FRY   2,875,016
DOMESTIC APPLIANCES

Filed July 22, 1954   2 Sheets-Sheet 2

INVENTOR.
Millard E. Fry
BY R R Caudor
His Attorney

United States Patent Office 2,875,016
Patented Feb. 24, 1959

2,875,016
DOMESTIC APPLIANCES

Millard E. Fry, Dayton, Ohio, assignor to General Motors Corporation, Detroit, Mich., a corporation of Delaware Application July 22, 1954, Serial No. 444,974

1 Claim. (Cl. 312—351)

This invention relates to a domestic appliance and more particularly to domestic electric ovens.

It is an object of my invention to provide an electric oven with a smooth easily cleaned oven liner provided with simple inexpensive readily removable shelf guides and shelves.

It is another object of my invention to provide an electric oven in which the spillage is easily caught and removed.

It is another object of my invention to provide an electric oven which has good heat distribution provided by simple readily removable and readily cleanable elements.

These objects are attained in the form shown by providing a smooth easily cleaned box-shaped oven liner having wire shelf guides removably mounted upon its sides. The shelf guides support a simplified form of removable shelves as well as a shallow pan which may be used to catch spillage and which also may be placed intermediate the top and bottom of the oven to divide the oven into upper and lower sub-compartments. This pan carries a removable drop door and at its side supports U-shaped tubular sheathed heating elements which fit into receptacles in either position of the pan. Beneath the pan there is provided a second tubular sheathed heater for the lower sub-compartment. A broil heater is also provided in the top of the oven compartment. The door is provided with a gasket type door seal.

Further objects and advantages of the present invention will be apparent from the following description, reference being had to the accompanying drawings wherein a preferred form of the invention is clearly shown.

Figure 1:
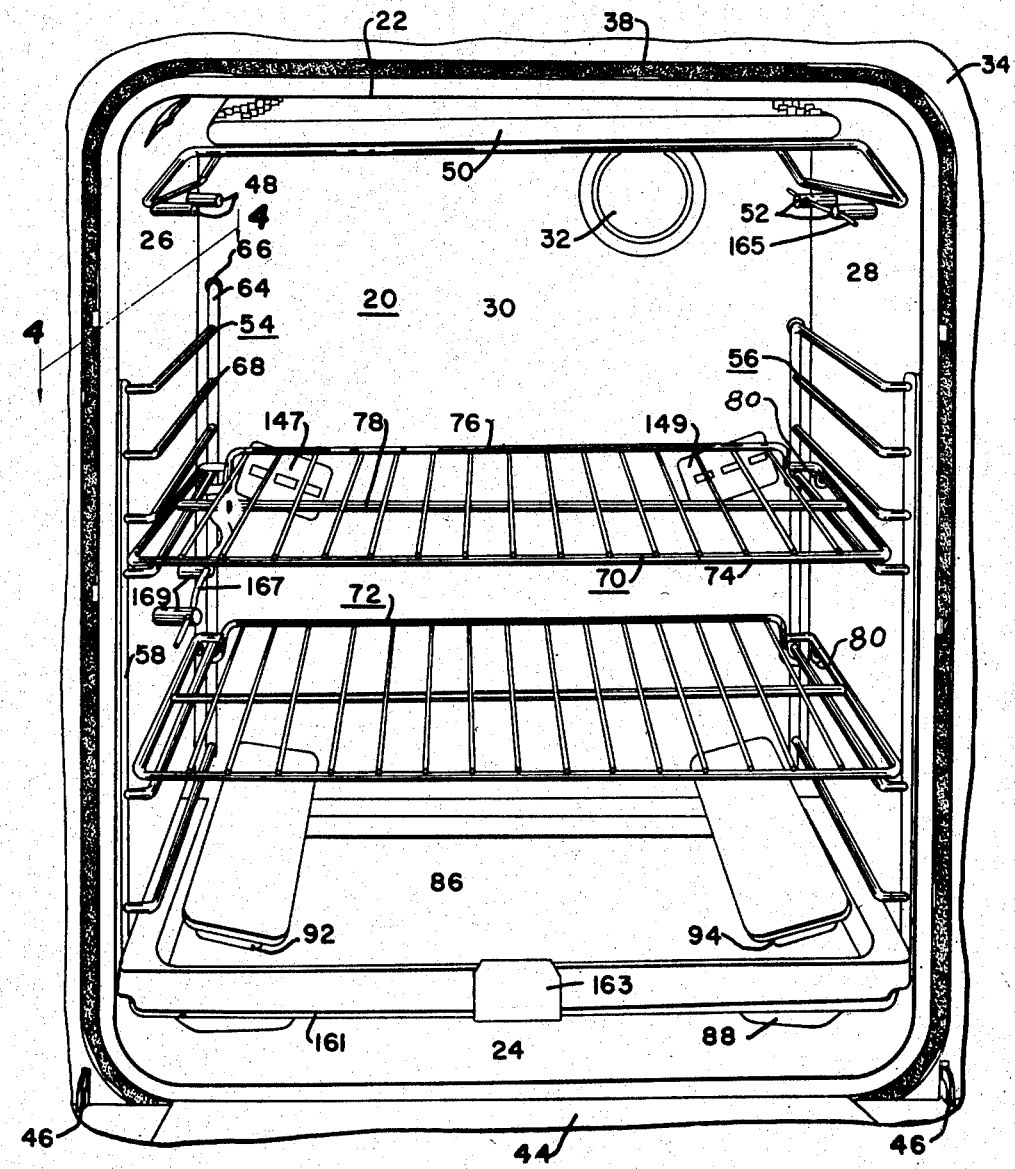
Figure 1 is a perspective view of an oven embodying one form of my invention arranged to provide a single large compartment.

Referring now to the drawings and more particularly to Figure 1, there is shown a substantially box-shaped smooth surfaced oven liner 20 having a substantially flat top 22, a substantially flat bottom 24, and flat side walls 26 and 28 and a substantially vertical rear wall 30. The rear wall 30 is provided with an illuminating light 32. The liner 20 is fitted into an aperture in a range frame front 34 which provides a structural front wall for the range. A tubular gasket seal 38 of Fiberglas or silicone rubber is provided on a front face of the oven as a heat seal therefor. The compartment enclosed by the oven liner 20 is adapted to be closed by an oven door 44 pivoted to the bottom of the door jam by the hinge elements 46. This door 44 cooperates with the gasket door seal 38 to substantially seal the oven compartment from the entrance of cold air. By excluding cold air from the oven compartment, more even baking temperatures are attained throughout the oven and the heating efficiency and economy is increased.

Figure 2:
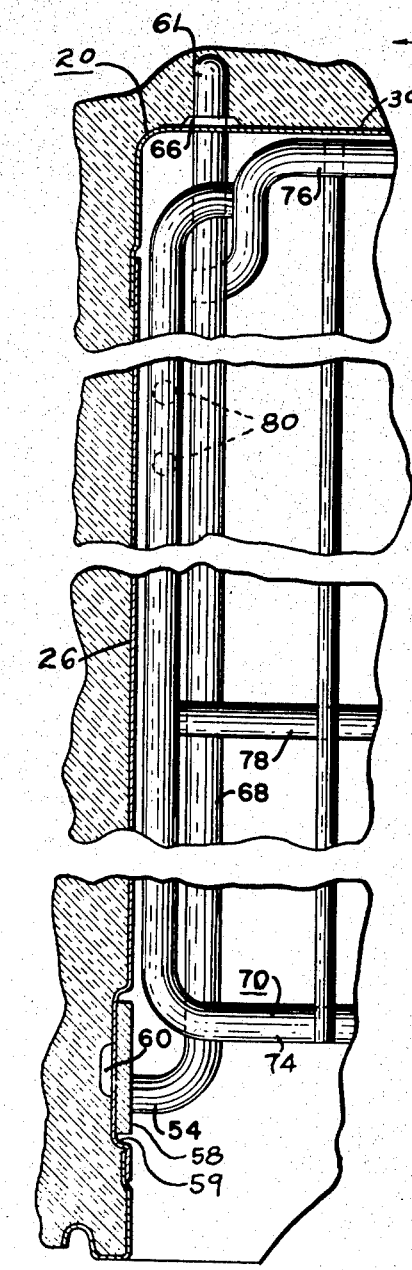
Figure 2 is a fragmentary sectional view taken substantially along the line 4—4 of Figure 1 showing one of the top shelf guides and a portion of one of the interchangeable removable shelves mounted on the top guide.
Figure 3:
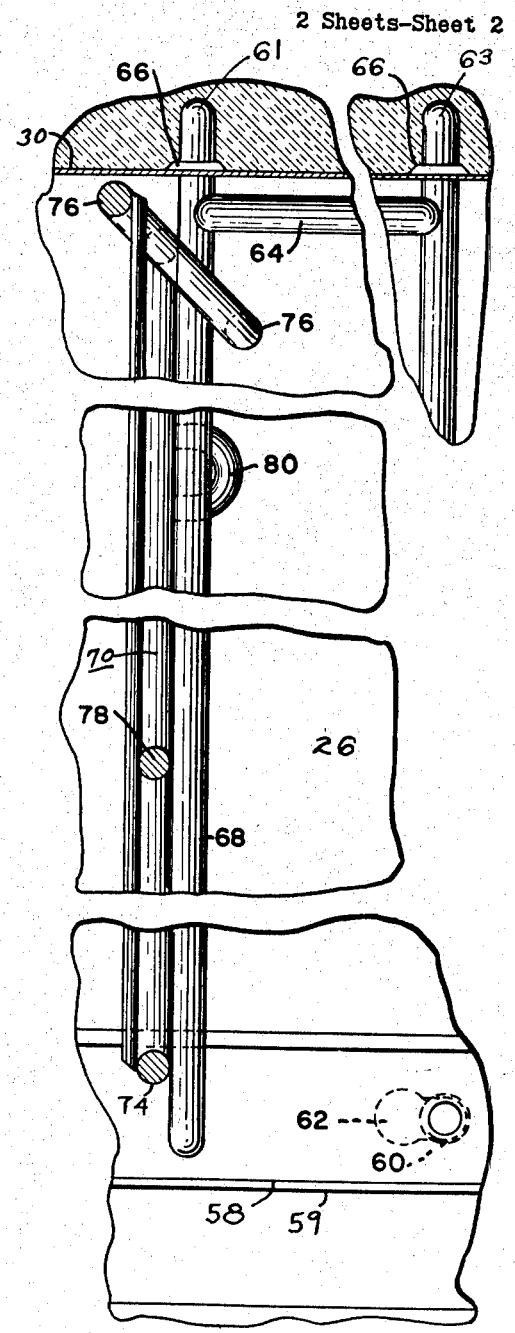
Figure 3 is a fragmentary sectional view taken substantially along the line 5—5 of Figure 2.

The side wall 26 is provided with two pins 48 which support one side of the broil heating means 50. The other side of the broil heating means 50 is supported by the pegs 52 upon the side wall 28. The side walls 26 and 28 are provided with shelf guides shown generally at 54 and 56. Taking the shelf guide 54 as an example of both and with reference to Figs. 2 and 3, it includes a front vertical member 58 of comparatively thin strip metal to which is riveted a projecting button or protuberance 60 which projects through a keyhole-shaped aperture 62 in a channel 59 in the front portion of the side wall 26 of the liner 20. The shelf guide 54 is also provided with a rear vertical support 64 in the form of a vertical wire having its upper and lower portions 61, 63 respectively bent rearwardly so that they extend through upper and lower apertures 66 in the rear wall 30 of the liner 20. These apertures may be provided with bushings of a nonmetallic heat resistant material. Extending between the front and rear vertical members 58 and 64 are several horizontal wire shelf guides or rods 68 having their front ends turned outwardly and riveted or welded to the vertical member 58 and their rear ends welded to the vertical member 64. The shelf guide 56 is constructed in a similar manner.

The shelf guides 54 and 56 may be removed simply by lifting up the front portion so that the button 60 may be removed from the top of the keyhole slot 62 after which the shelf guide 54 may be removed from the oven simply by pulling outwardly so that the upper and lower portions 61, 63 of the rear vertical member 64 are pulled out of the apertures 66 in the rear wall 30.

The shelf guides 54 and 56 may be used to support shelves of a variety of shapes and types. I have provided a simple form of slideable and removable type wire shelves shown generally at 70 and 72. These shelves are identical and therefore the shelf 70 will be described in detail as an example of each. The shelf 70 includes a heavy U-shaped wire bar 74 having its rear portions welded to the rear cross bar 76. This rear cross bar 76 has turned down ends which extend beneath the shelf guides to prevent tipping by the weight upon the front when the shelf 70 is pulled out. An intermediate cross bar 78 of heavy wire extends between the sides of the bar 70. The front and rear portions of the U-shaped bar 74 as well as the intermediate cross bar 78 rest at either end upon one of the horizontal shelf guides. The rear portion of the U-shaped member 74 may be provided with a downwardly extending projection 80 to prevent the accidental removal or pulling out of the shelf 70 beyond a safe limit. This projection 80 will engage the outwardly extending front end portion of the shelf guide upon which rests the shelf 70.

When the oven is to be used as shown in Figure 1, there is placed on the lowermost shelf guides a shallow pan 86 extending from side to side and front to rear within the oven compartment. This shallow pan 86 serves at least three useful purposes. It catches any spillage which may result of liquids and foods boiling out or overflowing from any container above it. This prevents such spillage from falling upon the bottom 24 of the oven liner or upon the lowermost electric heater 88 which is a sheathed tubular heating element in the form of a square shaped loop. This heater 88 plugs into a receptacle provided in the rear wall 30.

The shallow pan 86 also serves to support on either side two hairpin tubular heaters 92 and 94 which in Figure 1 are plugged into bottom rear wall receptacles which are identical to middle rear wall receptacles 147 and 149.

The additional receptacles 147 and 149 are located at an intermediate height and tilted at an angle of about 15°. These receptacles are adapted to receive the prongs of the heaters 92 and 94 when the pan 86 and the two heater assemblies of the heaters 92 and 94 are placed upon the shelf guide in the middle of the oven shown supporting shelf 70 in Figure 1. When in this position the pan 86 substantially divides the oven compartment into an upper sub-compartment and a lower sub-compartment. The shelf 70 may then be moved to one of the upper shelf guides. The shelf 72 may then be moved to one of the lower shelf guides.

For baking the upper compartment will be heated by the heaters 92 and 94 with the assistance of a reduced amount of heating from the broil heater 50. A thermostatic bulb 165 extends through apertures in the pins or projections 52 to control the heat provided by the heaters 92, 94 and 50 to maintain the upper sub-compartment at the temperature desired. A second thermostatic bulb 167 is supported upon the projections 169 in the lower sub-compartment for controlling the lower heater 88 to maintain the desired temperature in the lower sub-compartment. When the pan 86 and the heaters 92 and 94 are in the position shown in Figure 1 a switching arrangement is provided by which the lower heater 88 is deenergized and the thermostat 165 is effective to control the heaters 92 and 94 as well as the heater 50. However for broiling only the heater 50 is used at full output.

The ready removability of the pan 86 makes it most convenient to carry it to the sink for cleaning. The heaters 92 and 94 can be readily removed from the pan 86 to further facilitate cleaning. Because of their tubular sheathed construction, the heaters 88, 92 and 94 can also be readily cleaned.

Reference is made to my copending application for Domestic Appliance, Serial No. 321,321, filed November 19, 1952, now Patent No. 2,767,298.

While the form of embodiment of the invention as herein disclosed constitutes a preferred form, it is to be understood that other forms might be adopted as may come within the scope of the claim which follows.

What is claimed is as follows:

A box-shaped oven liner having a front opening and substantially flat inner walls including side walls and a rear wall, an aperture in said rear wall adjacent one of said side walls, a channel vertically disposed in one of said side walls adjacent said opening, said channel having a keyhole slot near an upper end thereof, said slot formed with an enlarged portion and a reduced portion, a pair of vertically disposed shelf supports in said oven liner, each of said shelf supports located adjacent one of said side walls and including a flat vertical member adjacent said channel and adapted to lie therein and a wire rod vertical member adjacent said aperture and having a projecting end portion adapted to insert into said aperture, said members being connected by a plurality of vertically spaced, horizontally extending wire guides, said flat vertical member having a protuberance removably interlocking with said reduced portion of said keyhole slot whereby said flat member is prevented from tipping and retained in said channel, said wire rod vertical member having a projecting end portion removably interfitting with said aperture whereby said rod member is prevented from tipping, said shelf supports thereby being removably secured within said oven liner, and a shelf resting on said horizontally extending guides and extending substantially the entire width of said oven liner into substantial sliding engagement with said flat member in said channel, said shelf including means cooperating with said shelf supports for limiting outward sliding movement of said shelf.

References Cited in the file of this patent

UNITED STATES PATENTS

| | | |
|---|---|---|
| 408,278 | White | Aug. 6, 1889 |
| 754,814 | Schriefer | Mar. 15, 1904 |
| 985,924 | Nelson | Mar. 7, 1911 |
| 1,055,522 | Cumming | Mar. 11, 1913 |
| 1,191,198 | Kuhn et al. | July 18, 1916 |
| 1,872,020 | Taylor | Aug. 16, 1932 |
| 1,896,307 | Hatch | Feb. 7, 1933 |
| 2,208,234 | Welch | July 16, 1940 |
| 2,466,360 | Bitney | Apr. 5, 1949 |
| 2,580,153 | Birkic | Dec. 25, 1951 |
| 2,604,375 | Beckett | July 22, 1952 |
| 2,671,004 | Chadwick | Mar. 2, 1954 |